United States Patent
Kubata et al.

(10) Patent No.: US 11,183,702 B2
(45) Date of Patent: Nov. 23, 2021

(54) CELL, CELL STACK, REDOX FLOW BATTERY, AND REDOX FLOW BATTERY SYSTEM

(71) Applicant: SUMITOMO ELECTRIC INDUSTRIES, LTD., Osaka (JP)

(72) Inventors: Michiru Kubata, Osaka (JP); Masahiro Kuwabara, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/976,989

(22) PCT Filed: Mar. 9, 2018

(86) PCT No.: PCT/JP2018/009349
§ 371 (c)(1),
(2) Date: Aug. 31, 2020

(87) PCT Pub. No.: WO2019/171603
PCT Pub. Date: Sep. 12, 2019

(65) Prior Publication Data
US 2021/0005917 A1    Jan. 7, 2021

(51) Int. Cl.
*H01M 8/18* (2006.01)
*H01M 4/86* (2006.01)
*H01M 8/0273* (2016.01)
*H01M 8/04537* (2016.01)

(52) U.S. Cl.
CPC ............. *H01M 8/188* (2013.01); *H01M 4/86* (2013.01); *H01M 8/0273* (2013.01); *H01M 8/04619* (2013.01); *H01M 2004/8684* (2013.01); *H01M 2004/8689* (2013.01)

(58) Field of Classification Search
CPC ...... H01M 8/188; H01M 4/86; H01M 8/0273; H01M 8/1004
See application file for complete search history.

(56) References Cited

U.S. PATENT DOCUMENTS

| 2002/0048546 | A1 | 4/2002 | Tanaka et al. | |
| 2009/0035634 | A1* | 2/2009 | Ohma | H01M 8/242 |
| | | | | 429/491 |
| 2018/0019483 | A1* | 1/2018 | Pezeshki | H01M 8/20 |

FOREIGN PATENT DOCUMENTS

| JP | 2002-020123 A | 1/2002 |
| JP | 2002-175822 A | 6/2002 |
| JP | 2009-016219 A | 1/2009 |

(Continued)

*Primary Examiner* — Stewart A Fraser
(74) *Attorney, Agent, or Firm* — Oliff PLC

(57) ABSTRACT

A cell that includes a positive electrode, a negative electrode and a membrane interposed between the electrodes, and that is used in a redox flow battery, wherein the membrane includes an ion permeable portion that is permeable to hydrogen ions, at least at a center of the membrane in a plan view, planar areas of the positive electrode and the negative electrode are both 250 $cm^2$ or more, and a planar area of the ion permeable portion is smaller than each of the planar areas of the positive electrode and the negative electrode, and, in the ion permeable portion, a planar area of a facing portion that actually faces the positive electrode and the negative electrode is 50% or more and 99.9% or less of a smaller of the planar areas of the positive electrode and the negative electrode.

13 Claims, 6 Drawing Sheets

(56) References Cited

FOREIGN PATENT DOCUMENTS

| | | |
|---|---|---|
| JP | 2012-164530 A | 8/2012 |
| JP | 2017-016788 A | 1/2017 |
| JP | 2017-027663 A | 2/2017 |

* cited by examiner

CELL, CELL STACK, REDOX FLOW BATTERY, AND REDOX FLOW BATTERY SYSTEM

TECHNICAL FIELD

The present invention relates to a cell, a cell stack, a redox flow battery, and a redox flow battery system.

BACKGROUND ART

Patent Documents 1 and 2 disclose redox flow battery systems including a cell that is charged by, and discharged to, a power grid, a tank that stores an electrolyte solution that is to be supplied to the cell, a circulation pump that circulates the electrolyte solution between the cell and the tank, and an AC/DC converter (power converter) that is arranged between the cell and the power grid.

CITATION LIST

Patent Documents

Patent Document 1: JP 2012-164530A
Patent Document 2: JP 2017-16788A

SUMMARY OF INVENTION

The present disclosure is directed to a cell that includes a positive electrode, a negative electrode and a membrane interposed between the electrodes, and that is used in a redox flow battery,
wherein the membrane includes an ion permeable portion that is permeable to hydrogen ions, at least at a center of the membrane in a plan view,
planar areas of the positive electrode and the negative electrode are both 250 cm$^2$ or more, and a planar area of the ion permeable portion is smaller than each of the planar areas of the positive electrode and the negative electrode, and
in the ion permeable portion, a planar area of a facing portion that actually faces the positive electrode and the negative electrode is 50% or more and 99.9% or less of a smaller of the planar areas of the positive electrode and the negative electrode.

The present disclosure is directed to a cell stack including:
a stacked body formed by stacking a plurality of the cells of the present disclosure; and
a pair of end plates that sandwich the stacked body from both sides of a stacking direction thereof.

The present disclosure is directed to a redox flow battery including:
the cell stack of the present disclosure;
a positive electrode circulation mechanism for circulating a positive electrolyte solution in the cells; and
a negative electrode circulation mechanism for circulating a negative electrolyte solution in the cells.

The present disclosure is directed to a redox flow battery system including:
the redox flow battery of the present disclosure;
a detecting apparatus that detects a failure of a power grid connected to the redox flow battery; and
a control unit that operates the positive electrode circulation mechanism and the negative electrode circulation mechanism, using the positive electrolyte solution and the negative electrolyte solution remaining in the cells, based on a detection result by the detecting apparatus.

DESCRIPTION OF EMBODIMENTS

Figure 1:
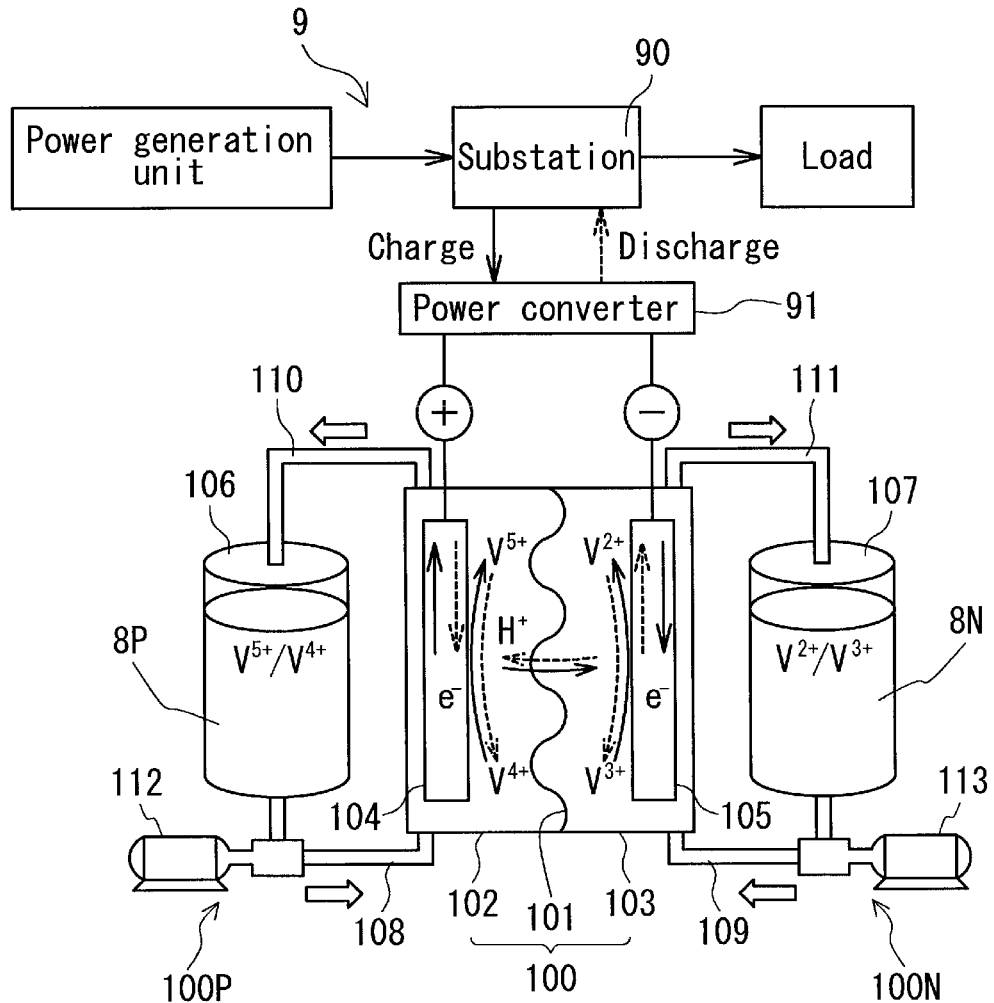
FIG. 1 is a diagram showing an operating principle of a redox flow battery.

Problem to be Solved by the Present Disclosure

Redox flow battery systems cannot discharge electricity by themselves to a power grid when the power grid fails. The reason for this is that, the redox flow battery systems cannot continuously charge or discharge electricity when a circulation pump for circulating an electrolyte solution in a cell stops. As measures against such a situation, Patent Document 1 describes an uninterruptible power supply (UPS) that drives a circulation pump when a power grid fails. However, a UPS is problematic in that, since the size thereof for obtaining an electric power that operates a circulation pump increases in accordance with an increase in the battery capacity of a redox flow battery, a large installation space is necessary or the installation cost increases.

Thus, it is an object of the present disclosure to provide a cell and a cell stack with which it is possible to construct a redox flow battery that can discharge electricity by itself to a power grid when the power grid fails. Furthermore, it is another object of the present disclosure to provide a redox flow battery and a redox flow battery system that can discharge electricity by themselves to a power grid when the power grid fails.

Description of Embodiments of the Present Disclosure

First, the content of embodiments of the invention of the present application will be listed and described.
<1> An embodiment is directed to a cell that includes a positive electrode, a negative electrode and a membrane interposed between the electrodes, and that is used in a redox flow battery,
wherein the membrane includes an ion permeable portion that is permeable to hydrogen ions, at least at a center of the membrane in a plan view,
planar areas of the positive electrode and the negative electrode are both 250 cm$^2$ or more, and a planar area of the ion permeable portion is smaller than each of the planar areas of the positive electrode and the negative electrode, and
in the ion permeable portion, a planar area of a facing portion that actually faces the positive electrode and the negative electrode is 50% or more and 99.9% or less of a smaller of the planar areas of the positive electrode and the negative electrode.

With the cell having this configuration, the emergency electrolyte solutions can be stored in the electrodes, and thus it is possible to construct a redox flow battery that can discharge electricity by itself to a power grid when the power grid fails. The reason why the emergency electrolyte solutions can be stored in the electrodes is that the planar areas of the electrodes in a plan view are both 250 cm$^2$ or more, and that, out of the planar areas of the positive electrode, the negative electrode, and the facing portion of the ion permeable portion of the membrane, the planar area of the facing portion is the smallest. Since the planar area of the facing portion of the ion permeable portion is smaller than each of the planar areas of the electrodes, the electrodes are each provided with a non-contact portion with which the ion permeable portion is not in contact, and thus the battery reaction of the electrolyte solution in that non-contact portion can be suppressed. The electrolyte solution whose battery reaction is suppressed can be used as an emergency electrolyte solution during a power failure. In this configuration, since the planar areas of the electrodes are both 250 cm$^2$ or more, the amount of electrolyte solution that flows in the electrodes increases, and thus a sufficient amount of emergency electrolyte solution can be ensured.

If the planar area of the facing portion of the ion permeable portion is 99.9% or less of the smaller electrode planar area, a sufficient amount of electrolyte solution to restart the redox flow battery can be ensured in the electrodes. Meanwhile, if the planar area of the ion permeable portion is 50% or more of the smaller electrode planar area, it is possible to prevent the battery reaction area from being excessively small and the battery capacity of the redox flow battery from being excessively lowered. The planar area of the ion permeable portion is preferably 60% or more and 95% or less, and more preferably 70% or more and 90% or less, of the smaller electrode planar area.

<2> In the cell according to the embodiment, it is possible that a planar area of the membrane is smaller than each of the planar areas of the positive electrode and the negative electrode.

If the planar area of the membrane is smaller than each of the planar areas of the electrodes, it is possible to reliably ensure the emergency electrolyte solutions, and to reduce the materials of the membrane.

<3> In the cell according to the embodiment in which a planar area of the membrane is smaller than each of the planar areas of the positive electrode and the negative electrode, it is possible that the cell further includes:

a first cell frame and a second cell frame that each have a bipolar plate and a frame member, and sandwich the membrane from one face side and another face side thereof;

a positive electrode space that is defined by the membrane and the bipolar plate of the first cell frame, and accommodates the positive electrode;

a negative electrode space that is defined by the membrane and the bipolar plate of the second cell frame, and accommodates the negative electrode; and a frame seal including an outer peripheral portion that is not in contact with the membrane and is in contact with the entire inner peripheral edge of the frame member, and an inner peripheral portion that is in contact with the entire outer peripheral edge of the membrane.

If the membrane is sandwiched between the first cell frame and the second cell frame, and is supported by the frame seal, it is possible to effectively suppress displacement of the membrane in the cell. Furthermore, if the frame seal seals the outer peripheral edge of the membrane and the inner peripheral edge of the frame member, it is possible to suppress mixing of the positive electrolyte solution and the negative electrolyte solution in the cell.

<4> In the cell according to the embodiment, it is possible that the membrane includes the ion permeable portion, and a frame-like ion impermeable portion that surrounds an outer periphery of the ion permeable portion, and a planar area of the membrane is larger than each of the planar areas of the positive electrode and the negative electrode.

If the planar area of the membrane is larger than each of the planar areas of the electrodes, it is possible to effectively prevent contact of the electrodes. Furthermore, when increasing the planar area of the membrane, if the membrane is constituted by the ion permeable portion and the ion impermeable portion, it is possible to reduce the amount of materials used to form the ion permeable portion.

<5> In the cell according to the embodiment in which a planar area of the membrane is larger than each of the planar areas of the electrodes, it is possible that the cell further includes:

a first cell frame and a second cell frame that each have a bipolar plate and a frame member, and sandwich the membrane from one face side and another face side thereof;

a positive electrode space that is defined by the membrane and the bipolar plate of the first cell frame, and accommodates the positive electrode; and a negative electrode space that is defined by the membrane and the bipolar plate of the second cell frame, and accommodates the negative electrode, wherein the ion impermeable portion of the membrane is in contact with an inner peripheral edge of the frame member of the first cell frame and an inner peripheral edge of the frame member of the second cell frame.

If the ion impermeable portion of the membrane is sandwiched between the frame member of the first cell frame and the frame member of the second cell frame, it is possible to effectively suppress displacement of the membrane in the cell. Furthermore, with the membrane held between the frame members of the cell frames that are adjacent to each other, it is possible to suppress mixing of the positive electrolyte solution and the negative electrolyte solution in the cell.

<6> In the cell according to the embodiment, it is possible that thicknesses of the positive electrode and the negative electrode are both 0.1 mm or more and 4 mm or less.

If the thicknesses of the electrodes are both 0.1 mm or more, it is possible to sufficiently ensure the amount of emergency electrolyte solution that can be stored in the electrodes. Furthermore, if the thicknesses of the electrodes are both 4 mm or less, it is possible to prevent the cell from being excessively thick. The thicknesses are both preferably 0.1 mm or more and 2.5 mm or less, and more preferably 0.1 mm or more and 1.5 mm or less.

<7> An embodiment is directed to a cell stack including:

a stacked body formed by stacking a plurality of the cells according to any one of the embodiments <1> to <6> above; and a pair of end plates that sandwich the stacked body from both sides of a stacking direction thereof.

If a redox flow battery is constructed using the cell stack described above, it is possible to obtain a redox flow battery that can discharge electricity by itself to a power grid when the power grid fails. The reason for this is that, if a cell stack is formed using the cells according to the embodiment, the emergency electrolyte solutions can be stored in the plurality of cells in the cell stack.

<8> An embodiment is directed to a redox flow battery including:

the cell stack according to the embodiment <7> above;

a positive electrode circulation mechanism for circulating a positive electrolyte solution in the cells; and a negative electrode circulation mechanism for circulating a negative electrolyte solution in the cells.

With the above-described redox flow battery, it is possible to operate the circulation pumps included in the positive and negative electrode circulation mechanisms, using the electric power of the electrolyte solutions remaining in the cells, when a power grid fails. If the circulation pumps can be operated, the electric power of the electrolyte solutions stored in tanks included in the positive and negative electrode circulation mechanisms can be extracted, and the operation of the circulation pumps can be further continued using the electric power. As a result, the electric power of the electrolyte solutions in the tanks can be discharged to the power grid. In this manner, the redox flow battery according to the embodiment can discharge electricity by itself to the power grid.

<9> An embodiment is directed to a redox flow battery system including:

the redox flow battery according to the embodiment <8> above;

a detecting apparatus that detects a failure of a power grid connected to the redox flow battery; and a control unit that operates the positive electrode circulation mechanism and the negative electrode circulation mechanism, using the positive electrolyte solution and the negative electrolyte solution remaining in the cells, based on a detection result by the detecting apparatus.

With the redox flow battery system including the detecting apparatus and the control unit, the redox flow battery can be automatically restarted when a power grid fails, and the electric power can be discharged from the redox flow battery to the power grid.

The redox flow battery system of this embodiment that can discharge electricity by itself when a power grid fails does not require a UPS. Since no UPS is required, for example, the following effects can be obtained.

[1] It is not necessary to ensure the installation space of a UPS, and thus the degree of freedom in setting the installation space of the redox flow battery system is high.

[2] It is possible to improve the battery capacity of the redox flow battery system, for example, by installing larger tanks in a space that was used as the installation space of a UPS.

[3] It is possible to reduce the effort and cost necessary to install a UPS.

Details of Embodiments of the Present Disclosure

Hereinafter, embodiments of a cell, a cell stack, a redox flow battery, and a redox flow battery system of the present disclosure will be described. Note that the invention of the present application is not limited to the configurations described in these embodiments, but is defined by the claims, and is intended to encompass all modifications within the meanings and scope that are equivalent to the claims.

Embodiment 1

Before a description of a cell, a cell stack, a redox flow battery, and a redox flow battery system according to the embodiment, a basic configuration of a redox flow battery (hereinafter, an RF battery) will be described with reference to FIG. 1.

Basic Configuration

An RF battery is a type of storage battery for circulating an electrolyte solution, and is used to store new energy from solar photovoltaic power generation, wind power generation, and the like. An operating principle of an RF battery will be described with reference to FIG. 1. An RF battery is a battery that is charged and discharged using the difference between the oxidation-reduction potential of active material ions contained in a positive electrolyte solution and the oxidation-reduction potential of active material ions contained in a negative electrolyte solution. The RF battery is connected via a power converter 91 to a substation 90 of a power grid 9, and is charged by, and discharged to, the power grid 9. The power grid 9 of this example is a power grid that performs AC transmission, and the power converter 91 is an AC/DC converter. It is also possible that the power grid is a power grid that performs DC transmission, and in that case the power converter is a DC/DC converter. Meanwhile, the RF battery includes a cell 100 that is divided into a positive electrode cell 102 and a negative electrode cell 103 by a membrane 101 that is permeable to hydrogen ions.

The positive electrode cell 102 accommodates a positive electrode 104, and is connected via pipes 108 and 110 to a positive electrolyte solution tank 106 for storing a positive electrolyte solution 8P. The pipe 108 is provided with a circulation pump 112, and a positive electrode circulation mechanism 100P for circulating the positive electrolyte solution 8P is constituted by these constituent elements 106, 108, 110, and 112. In a similar manner, the negative electrode cell 103 accommodates a negative electrode 105, and is connected via pipes 109 and 111 to a negative electrolyte solution tank 107 for storing a negative electrolyte solution 8N. The pipe 109 is provided with a circulation pump 113, and a negative electrode circulation mechanism 100N for circulating the negative electrolyte solution 8N is constituted by these constituent elements 107, 109, 111, and 113. The electrolyte solutions 8P and 8N stored in the tanks 106 and 107 are circulated in the cells 102 and 103 by the circulation pumps 112 and 113 when performing charge/discharge. When charge/discharge is not performed, the circulation pumps 112 and 113 are stopped, and the electrolyte solutions 8P and 8N are not circulated.

Cell

Hereinafter, a cell 1 according to the embodiment will be described based on the basic configuration of the RF battery described above with reference to FIGS. 2 and 3. The cell 1 of this example includes a first cell frame 2A and a second cell frame 2B that are adjacent to each other, and a positive electrode 104, a negative electrode 105, and a membrane 3 that are arranged between the cell frames 2A and 2B. The cell 1 of this example further includes a pair of frame seals 4A and 4B. Although FIG. 3 shows a state in which the first cell frame 2A and the second cell frame 2B are separate from each other, the cell frames 2A and 2B are actually in substantially close contact with each other. Hereinafter, the constituent elements of the cell 1 will be described in detail.

Cell Frame

The first cell frame 2A and the second cell frame 2B are the same constituent elements, and each have a frame member 22 that has a through window, and a bipolar plate 21 that blocks the through window. That is to say, the frame member 22 supports the bipolar plate 21 from the outer peripheral side. In this example, the external shape of the frame member 22 and the shape of the bipolar plate 21 included in each of the cell frames 2A and 2B are both rectangular shapes, but they may be circular shapes, polygonal shapes, or the like. Sealing members 2s are sandwiched between the frame member 22 of the first cell frame 2A and the frame member 22 of the second cell frame 2B, thereby preventing an electrolyte solution from leaking from a gap between the frame members 22.

The cell frames 2A and 2B can be produced, for example, by molding a frame member 22 in one piece with the outer peripheral portion of a bipolar plate 21. Alternatively, the cell frames 2A and 2B can be produced by preparing a frame member 22 in which a portion near the outer periphery of the through window is formed thin, and a bipolar plate 21 produced separately from the frame member 22, and fitting the outer peripheral portion of the bipolar plate 21 to the thin portion of the frame member 22. In this case, the bipolar plate 21 may be either merely placed on the frame member 22 or bonded thereto.

As shown in FIG. 3, the first cell frame 2A is provided with a positive electrode space 204 defined by the face of the bipolar plate 21 on one side, the inner peripheral face of the frame member 22, and the membrane 3, which will be described later, and the positive electrode 104 is arranged in the positive electrode space 204. Furthermore, the second cell frame 2B is provided with a negative electrode space 205 defined by the face of the bipolar plate 21 on the other side, the inner peripheral face of the frame member 22, and the membrane 3, which will be described later, and the negative electrode 105 is arranged in the negative electrode space 205. With this configuration, one cell 1 is formed between the bipolar plates 21 fitted to the cell frames 2A and 2B that are adjacent to each other.

Figure 2:
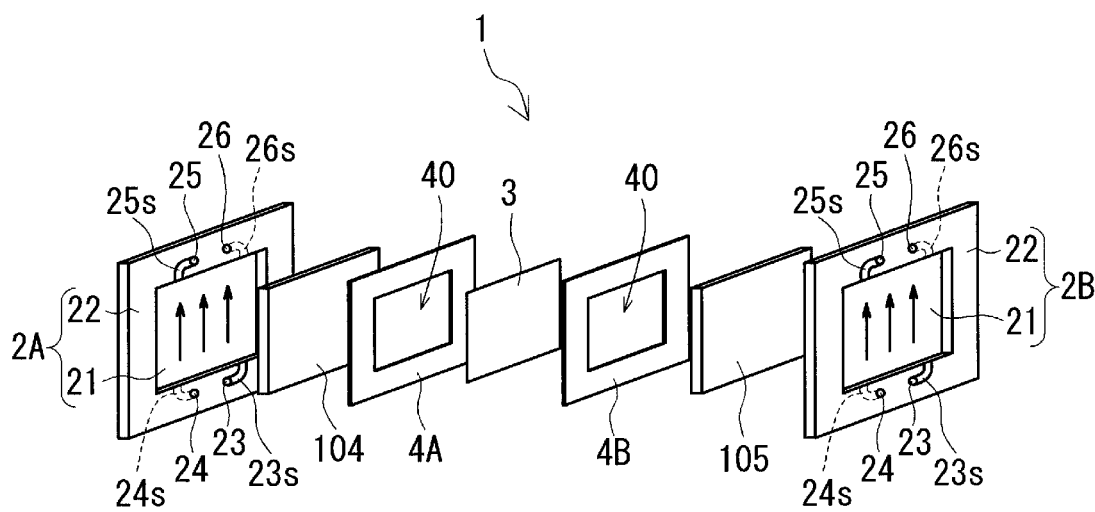
FIG. 2 is an exploded view of a cell according to Embodiment 1.
Figure 3:
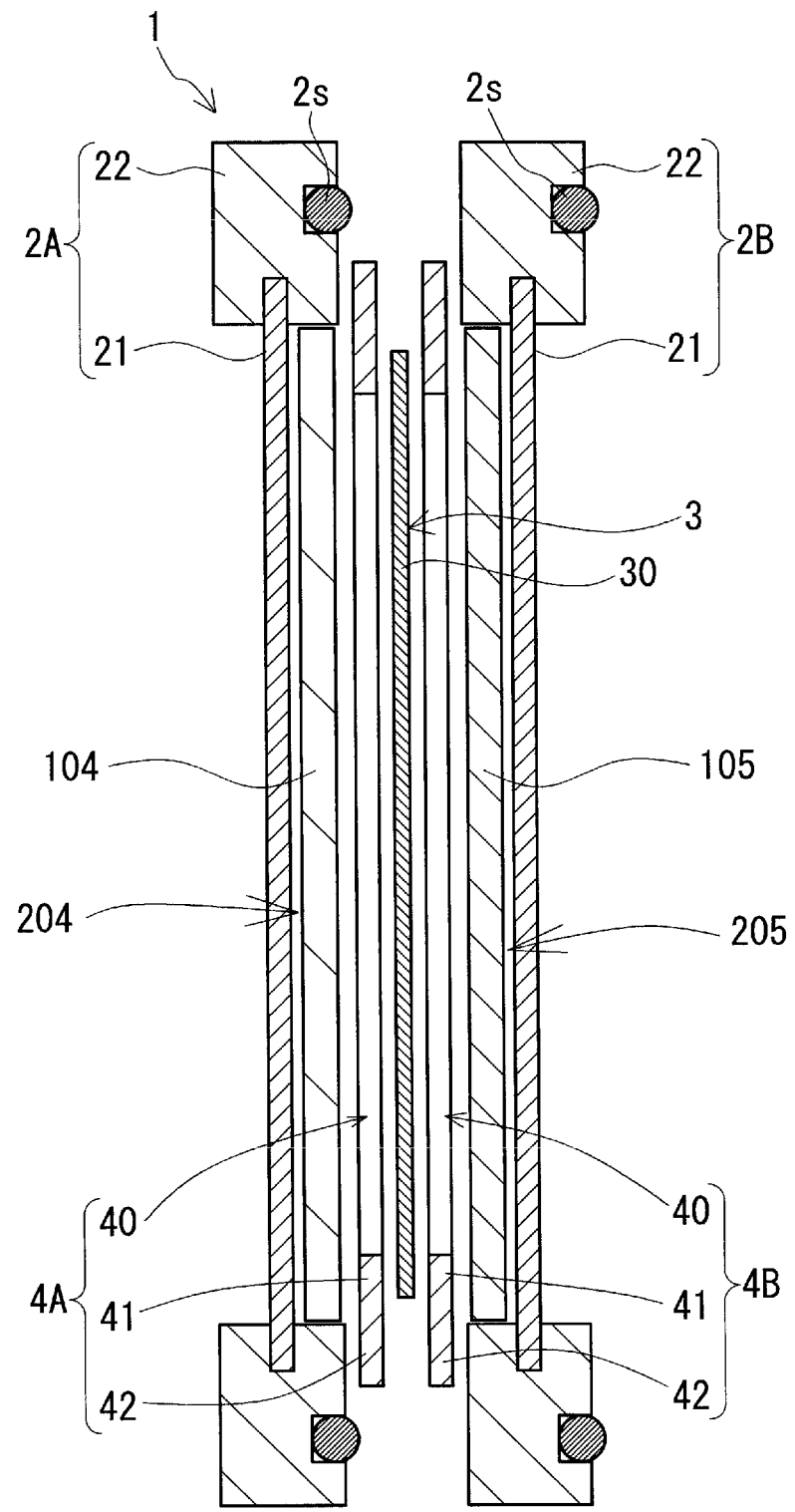
FIG. 3 is a vertical cross-sectional view of the cell according to Embodiment 1.

The electrolyte solution is caused to flow to the frame member 22 by supply manifolds 23 and 24 and discharge manifolds 25 and 26 (FIG. 2). The positive electrolyte solution is supplied from the supply manifold 23 via an inlet slit 23s formed on the one face side (the front side in the section of the diagram) of the cell frames 2A and 2B to the positive electrode 104, and is discharged via an outlet slit 25s formed in the upper portion of the cell frames 2A and 2B to the discharge manifold 25. In a similar manner, the negative electrolyte solution is supplied from the supply manifold 24 via an inlet slit 24s formed on the other face side (the back side in the section of the diagram) of the cell frames 2A and 2B to the negative electrode 105, and is discharged via an outlet slit 26s formed in the upper portion of the cell frames 2A and 2B to the discharge manifold 26.

The bipolar plate 21 and the frame member 22 can be made of known materials. For example, the bipolar plate 21 can be made of plastic carbon or the like, and the frame member 22 can be made of plastic such as vinyl chloride resin, polypropylene, polyethylene, fluororesin, epoxy resin, or the like.

Electrode

As shown in FIG. 3, the positive electrode 104 is accommodated in the positive electrode space 204 of the first cell frame 2A, and the negative electrode 105 is accommodated in the negative electrode space 205 of the second cell frame 2B. The positive electrode 104 and the negative electrode 105 are arranged so as to face each other with the membrane 3 interposed therebetween. The positive electrode 104 and the negative electrode 105 of this example respectively have substantially the same sizes and the same shapes as those of the positive electrode space 204 and the negative electrode space 205. The positive electrode 104 and the negative electrode 105 may have different sizes or shapes.

The thickness of the positive electrode 104 (the negative electrode 105) may be larger than the depth of the positive electrode space 204 (the negative electrode space 205). In that case, when the cell 1 is assembled by tightening the cell frames 2A and 2B together in the stacking direction (the left-right direction in the section of the diagram of FIG. 2), the positive electrode 104 (the negative electrode 105) is compressed and is accommodated in the positive electrode space 204 (the negative electrode space 205).

The planar areas of the electrodes 104 and 105 in a plan view are both 250 $cm^2$ or more. If the planar areas of the electrodes 104 and 105 are both 250 $cm^2$ or more, as described later, a sufficient amount of emergency electrolyte solution to restart an RF battery 10 can be stored in the cell 1. Furthermore, it is possible to increase the power of the RF battery by increasing the planar areas. In view of these points, the planar areas are preferably 300 $cm^2$ or more, and more preferably 400 $cm^2$ or more.

Furthermore, the thickness of the positive electrode 104 (the negative electrode 105) accommodated in the positive electrode space 204 (the negative electrode space 205) is preferably 0.1 mm or more and 4 mm or less. If the thicknesses of the electrodes 104 and 105 are both 0.1 mm or more, it is possible to sufficiently ensure the amount of emergency electrolyte solution that can be stored in the electrodes 104 and 105. Furthermore, if the thicknesses of the electrodes 104 and 105 are both 4 mm or less, it is possible to prevent the cell 1 from being excessively thick. The thicknesses are preferably 0.1 mm or more and 2.5 mm or less, and more preferably 0.1 mm or more and 1.5 mm or less.

The electrodes 104 and 105 can be made of known materials, and are preferably made of an elastic porous material. For example, the electrodes 104 and 105 can be made of carbon felt or the like.

Membrane

The membrane 3 is interposed between the positive and negative electrodes 104 and 105, between the cell frames 2A and 2B. The membrane 3 includes an ion permeable portion 30, at least at the center of the membrane 3 in a plan view. The ion permeable portion 30 is a portion that is permeable to hydrogen ions but is impermeable to active material ions, and the entire face of the membrane 3 of this example is constituted by the ion permeable portion 30.

The membrane 3 of this example is formed in the size that does not allow the membrane 3 to reach the inner peripheral edge of the frame member 22, and the planar area of the membrane 3, that is, the planar area of the ion permeable portion 30 is smaller than each of the planar areas of the electrodes 104 and 105. Furthermore, in the case of this example, the frame seals 4A and 4B, which will be described later, are interposed respectively between the membrane 3 and the electrodes 104 and 105, and thus, in the ion permeable portion 30, the planar area of a facing portion that actually faces the electrodes 104 and 105 is smaller than the planar area of the entire ion permeable portion 30. The planar area of the facing portion is 50% or more and 99.9% or less of the smaller of the planar areas of the electrodes 104 and 105. The planar area of the facing portion is preferably 60% or more and 95% or less, and more preferably 70% or more and 90% or less, of the smaller electrode planar area. The meaning in limiting the planar area of the facing portion will be described in detail in the field of "Effects" below.

The membrane 3 can be made of known materials. For example, the membrane 3 can be made of a sulfonated copolymer of styrene and divinylbenzene, a copolymer of perfluorosulfonic acid and polytetrafluoroethylene, or the like.

Frame Seal

The frame seals 4A and 4B are frame-like members that are arranged respectively on the positive electrode 104 side and the negative electrode 105 side of the membrane 3, and seal the positive and negative electrolyte solutions respectively in the positive electrode space 204 and the negative electrode space 205. It is also possible that only the frame seal 4A is provided on the positive electrode 104 side of the membrane 3, or that only the frame seal 4B is provided on the negative electrode 105 side of the membrane 3. The frame seals 4A and 4B each have a through hole 40 (see FIG. 2, in particular), and the frame seals 4A and 4B each have an inner peripheral contour (the contour of the through hole 40) that is smaller than the contour of the membrane 3, and an outer peripheral contour that is larger than the inner peripheral contour of the frame member 22. Accordingly, each of the frame seals 4A and 4B is functionally divided into an inner peripheral portion 41 that is in contact with the entire peripheral edge of the membrane 3, and an outer peripheral portion 42 that is not in contact with the membrane 3 and is sandwiched between the frame members 22 of the cell frames 2A and 2B.

If the frame seals 4A and 4B having the above-described configuration are interposed respectively between the membrane 3 and the electrodes 104 and 105, as shown in FIG. 3, in the ion permeable portion 30 of the membrane 3, a portion exposed from the through holes 40 of the frame seals 4A and 4B is a facing portion that actually faces the electrodes 104 and 105. That is to say, in the case of this example, the planar area of the facing portion of the ion permeable portion 30 can be said to be equal to the opening area of the through holes 40 of the frame seals 4A and 4B.

When the cell 1 is assembled by tightening the cell frames 2A and 2B together in the stacking direction (the left-right direction in the section of the diagram of FIG. 2), the inner peripheral portions 41 of the frame seals 4A and 4B are respectively pressed by the repulsive force of the electrodes 104 and 105, and are in intimate contact (close contact) with the peripheral edge of the membrane 3. Furthermore, the outer peripheral portions 42 of the frame seals 4A and 4B are sandwiched and pressed between the frame members 22, and are in intimate contact (close contact) with the frame members 22. The sealing members 2s in FIG. 3 may be omitted as long as the gap between the frame members 22 of the cell frames 2A and 2B can be sealed by the frame seals 4A and 4B.

The frame seals 4A and 4B are in the form of sheets or films, and the thicknesses thereof are both, for example, 0.1 mm or more and 2.0 mm or less, and preferably 0.2 mm or more and 0.6 mm or less. For example, the frame seals 4A and 4B are made of a material that is resistant to electrolyte solutions, and less expensive and stronger than that of the membrane 3. For example, the frame seals 4A and 4B are made of plastic, such as vinyl chloride resin, polypropylene, polyethylene, fluororesin, epoxy resin or the like, or rubber.

Since the inner peripheral portions 41 of the frame seals 4A and 4B are in close contact with the peripheral edge of the membrane 3 due to the repulsive force of the electrodes 104 and 105, the inner peripheral portions 41 of the frame seals 4A and 4B and the membrane 3 can be sealed to each other. Furthermore, since the outer peripheral portions 42 of the frame seals 4A and 4B are in close contact with the frame members 22, the outer peripheral portions 42 of the frame seals 4A and 4B and the frame members 22 can be sealed to each other. Accordingly, with the frame seals 4A and 4B, it is possible to reduce the planar area of the membrane 3 compared with conventional examples, to suppress leakage of an electrolyte solution from the spaces 204 and 205, and to suppress mixing of the positive and negative electrolyte solutions. Since the area of the membrane 3 can be reduced, it is possible to reduce the amount of materials used to form the membrane 3, thereby reducing the cost.

Effects

With the cell 1 having the above-described configuration, the emergency electrolyte solutions can be stored in the electrodes 104 and 105, and thus it is possible to construct a redox flow battery that can discharge electricity by itself to a power grid when the power grid fails. The reason why the emergency electrolyte solutions can be stored in the electrodes 104 and 105 is that the planar areas of the electrodes 104 and 105 in a plan view are both 250 cm$^2$ or more, and that the planar area of the facing portion of the ion permeable portion 30 is smaller than each of the planar areas of the electrodes 104 and 105. Since the planar area of the facing portion of the ion permeable portion 30 is smaller than each of the planar areas of the electrodes 104 and 105, the electrodes 104 and 105 are each provided with a non-contact portion with which the ion permeable portion 30 is not in contact, and thus the battery reaction of the electrolyte solution in that non-contact portion can be suppressed. The electrolyte solution whose battery reaction is suppressed can be used as an emergency electrolyte solution during a power failure. In this configuration, since the planar areas of the electrodes 104 and 105 are both 250 cm$^2$ or more, the amount of electrolyte solution that flows in the electrodes 104 and 105 increases, and thus a sufficient amount of emergency electrolyte solution can be ensured.

Cell Stack

Figure 4:
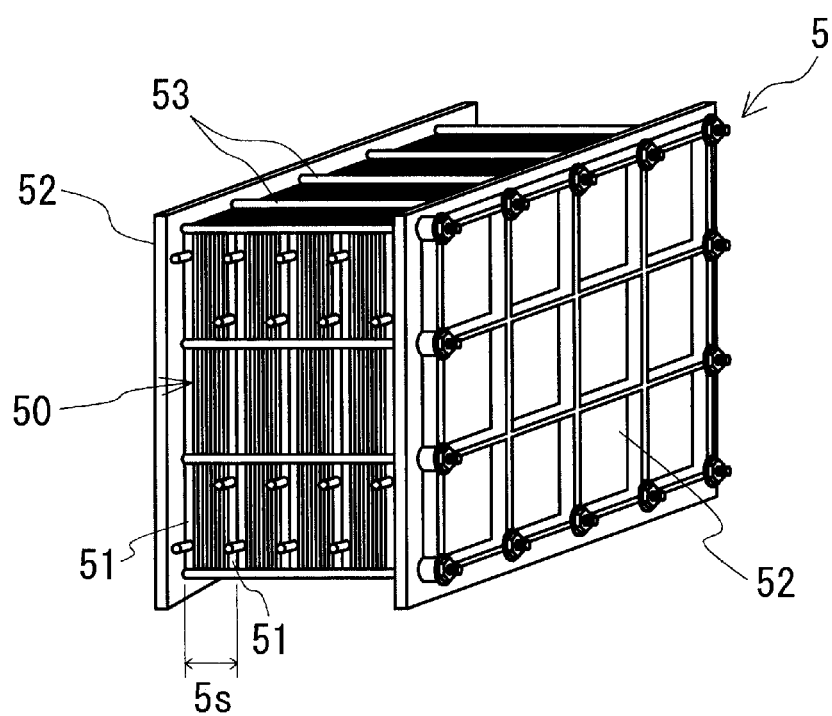
FIG. 4 is a vertical cross-sectional view of a cell stack according to Embodiment 1.

Typically, the cell 1 described above is formed inside the structure called a cell stack 5 as shown in FIG. 4. The cell stack 5 has a configuration in which a stacked body 50 formed by stacking a plurality of sub stacks 5s is sandwiched between two end plates 52, and is tightened by tightening mechanisms 53. The sub stacks 5s are each formed by stacking a plurality of the cells 1 shown in FIGS. 2 and 3, and sandwiching the stacked body between supply/discharge plates 51.

If a redox flow battery is constructed using the cell stack 5, it is possible to obtain a redox flow battery that can discharge electricity by itself to a power grid when the power grid fails. The reason for this is that, if a cell stack 5 is formed using the cells 1 shown in FIGS. 2 and 3, the emergency electrolyte solutions can be stored in the plurality of cells 1 in the cell stack 5.

RF Battery and RF Battery System

Figure 5:
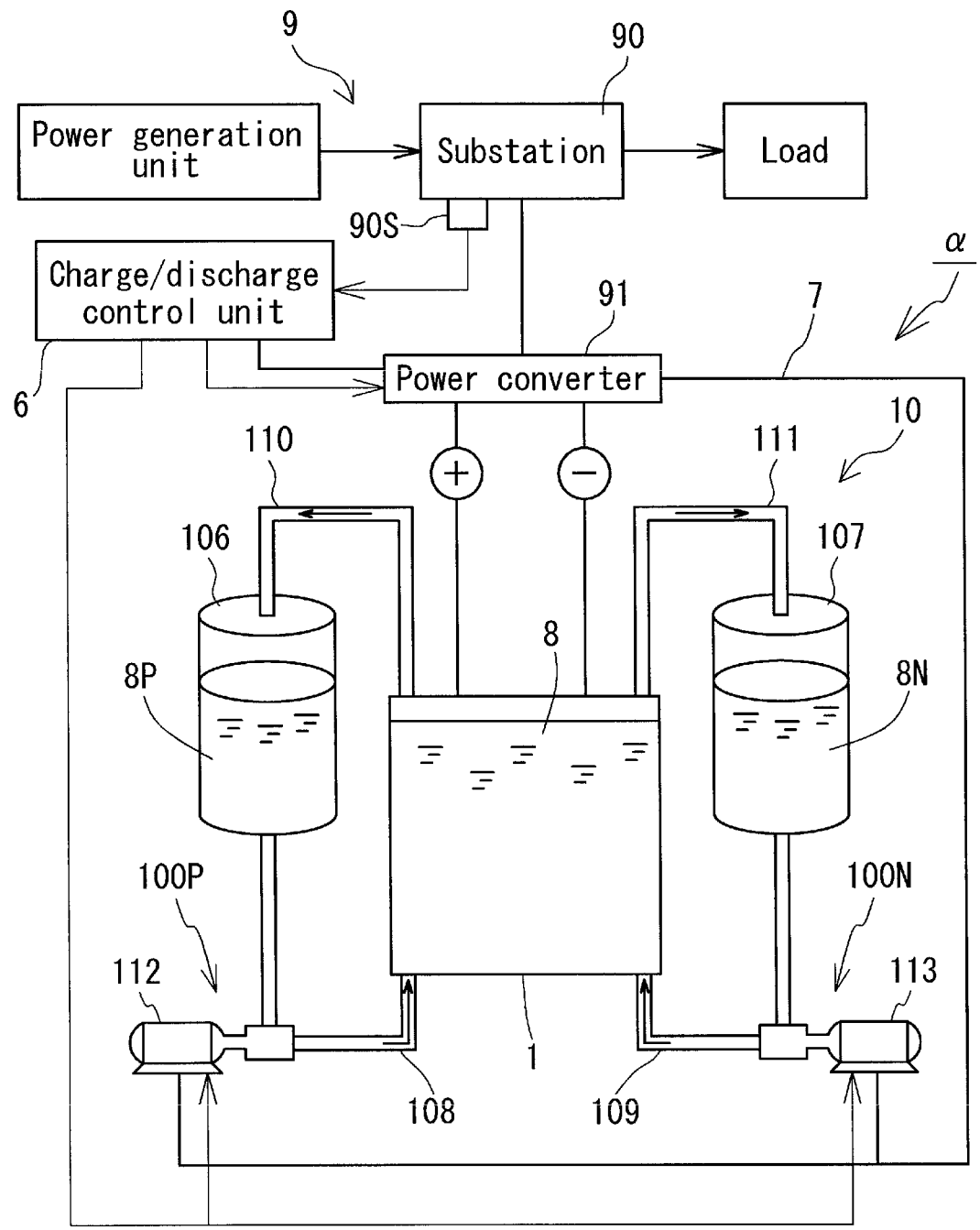
FIG. 5 is a schematic configuration diagram of a redox flow battery system including the redox flow battery according to Embodiment 1.

Hereinafter, the RF battery 10 and an RF battery system α including the RF battery 10 will be described with reference to FIG. 5. The RF battery 10 includes the cell stack 5 shown in FIG. 4, and the circulation mechanisms 100P and 100N connected to the cell stack 5. The configuration of the circulation mechanisms 100P and 100N is the same as the basic configuration described with reference to FIG. 1. For the sake of convenience, FIG. 5 shows the cell 1 instead of the cell stack 5. Furthermore, although FIG. 5 schematically shows the liquid surface of the electrolyte solution 8 stored in the cell 1, the positive electrolyte solution 8P and the negative electrolyte solution 8N are not mixed with each other in the actual cell 1.

Charge/Discharge Control Unit

The RF battery system α of this example includes a charge/discharge control unit 6 that controls charge and discharge of the cell 1. More specifically, the charge/discharge control unit 6 controls charge and discharge of the cell 1, by controlling the operation of the power converter 91 and the circulation pumps 112 and 113 through signal lines indicated by the thin arrows. The power converter 91 that is controlled by the charge/discharge control unit 6 is a DC/AC converter if the power grid 9 is an AC system, and is a DC/DC converter if the power grid 9 is a DC system, for example.

A signal line extending from a detecting apparatus 90S that detects a failure of the power grid 9 is connected to the charge/discharge control unit 6. Accordingly, the charge/discharge control unit 6 can be notified of a failure of the power grid 9, based on a detection result by the detecting apparatus 90S. As the detecting apparatus 90S, it is possible to use, for example, a voltmeter that is included in the substation 90 and monitors the voltage in the power grid 9.

The charge/discharge control unit 6 is electrically connected to the power converter 91. The charge/discharge control unit 6 may be configured such that the electric power is always supplied from the cell 1, or such that the electric power is supplied from the power grid 9 when the power grid 9 does not fail and from the cell 1 when the power grid 9 fails.

The RF battery system α of this example is provided with a pump line 7 through which the electric power is supplied from the power converter 91 to the circulation pumps 112 and 113. The pump line 7 may branch between the power converter 91 and the power grid 9 and extend to the circulation pumps 112 and 113. With this configuration, it is possible to operate the circulation pumps 112 and 113 using the electric power from the power grid 9 when the power grid 9 does not fail, and to operate the circulation pumps 112 and 113 using the electric power of the electrolyte solution 8 remaining in the cell 1 when the power grid 9 fails. The amount of electric energy that is supplied to the circulation pumps 112 and 113 is controlled by the charge/discharge control unit 6. An operation signal of the circulation pumps 112 and 113 of this example is emitted from the charge/discharge control unit 6 as indicated by the thin arrows. The operation signal is a signal that turns on/off of the circulation pumps 112 and 113. As the circulation pumps 112 and 113 of this example, those that operate on alternating current are used. If the power grid 9 is a DC transmission system, as the circulation pumps 112 and 113, those that operate on direct current are used.

Electrolyte Solution

As the positive electrolyte solution 8P and the negative electrolyte solution 8N that are used in the RF battery 10, known electrolyte solutions can be used. Example of the positive and negative electrolyte solutions include an electrolyte solution containing V ions as active materials of the positive electrode and the negative electrode, an electrolyte solution containing Fe ions as active materials of the positive electrode and Cr ions as active materials of the negative electrode, an electrolyte solution containing Mn ions as active materials of the positive electrode and Ti ions as active materials of the negative electrode, and the like.

In this example, the tanks 106 and 107 are arranged such that the liquid surfaces of the electrolyte solutions 8P and 8N in the tanks 106 and 107 are higher than the liquid surface of the electrolyte solution 8 in the cell 1. This arrangement is made in order to retain the electrolyte solution 8 in the cell 1 when circulation of the electrolyte solutions 8P and 8N stops. Alternatively, the pipes 108 and 109 may be provided with valves such that, even when circulation of the electrolyte solutions 8P and 8N stops, the electrolyte solution 8 can be retained in the cell 1. In that case, there is no particular limitation on the arrangement of the tanks 106 and 107.

Operation Method of RF Battery System During Normal Operation

When the RF battery system α is normally operated (when the power does not fail), the charge/discharge control unit 6 of the RF battery system α controls charge and discharge of the cell 1, by controlling the operation of the power converter 91 and the circulation pumps 112 and 113.

When the RF battery system α is normally operated, there are cases in which the circulation pumps 112 and 113 are stopped, so that the circulation of the electrolyte solutions 8P and 8N to the cell 1 is stopped. The circulation pumps 112 and 113 are stopped, for example, when the RF battery 10 has been sufficient charged.

During Failure of Power Grid

When the power grid 9 fails, the charge/discharge control unit 6 of the RF battery system α operates the circulation pumps 112 and 113 using the electric power of the electrolyte solution 8 remaining in the cell 1, so that the electric power of the electrolyte solutions 8P and 8N in the tanks 106 and 107 is discharged to the power grid 9. The reason why the electric power that is sufficient to operate the circulation pumps 112 and 113 can be extracted from the electrolyte solution 8 in the cell 1 is that the cell 1 described with reference to FIGS. 2 and 3 can store the emergency electrolyte solution 8.

Hereinafter, specific operations of the RF battery system α when the power grid 9 fails will be described. First, the charge/discharge control unit 6 detects a failure of the power grid 9, based on a change in the voltage of the power grid 9, using the detecting apparatus 90S. Upon detecting a failure of the power grid 9, the charge/discharge control unit 6 restarts in a mode dedicated to a power failure. The charge/discharge control unit 6 is restarted using the electric power of the electrolyte solution 8 remaining in the cell 1.

The charge/discharge control unit 6 that has started in a mode dedicated to a power failure gives a command to the power converter 91, thereby causing the power converter 91 to generate the AC electric power at a frequency optimal to operate the circulation pumps 112 and 113. Then, the charge/discharge control unit 6 causes the power converter 91 to supply the AC power to the circulation pumps 112 and 113, thereby operating the circulation pumps 112 and 113. Once the circulation pumps 112 and 113 operate, the electrolyte solutions 8P and 8N in the tanks 106 and 107 are sent into the cell 1, and the electric power of the electrolyte solutions 8P and 8N can be extracted, and thus the operation of the circulation pumps 112 and 113 can be further continued. As a result, the electric power of the electrolyte solutions 8P and 8N in the tanks 106 and 107 can be discharged to the power grid 9.

Effects

As descried above, the RF battery system α of this example can discharge electricity by itself when the power grid 9 fails, and thus no UPS is required for the RF battery system α. Since no UPS is required, the following effects can be obtained.

[1] It is not necessary to ensure the installation space of a UPS, and thus the degree of freedom in setting the installation space of the RF battery system α is high.

[2] It is possible to improve the battery capacity of the RF battery system α, for example, by installing larger tanks 106 and 107 in a space that was used as the installation space of a UPS.

[3] It is possible to reduce the effort and cost necessary to install a UPS.

Embodiment 2

In Embodiment 2, a cell 1 different from that in Embodiment 1 will be described with reference to FIGS. 6 and 7.

Figure 6:
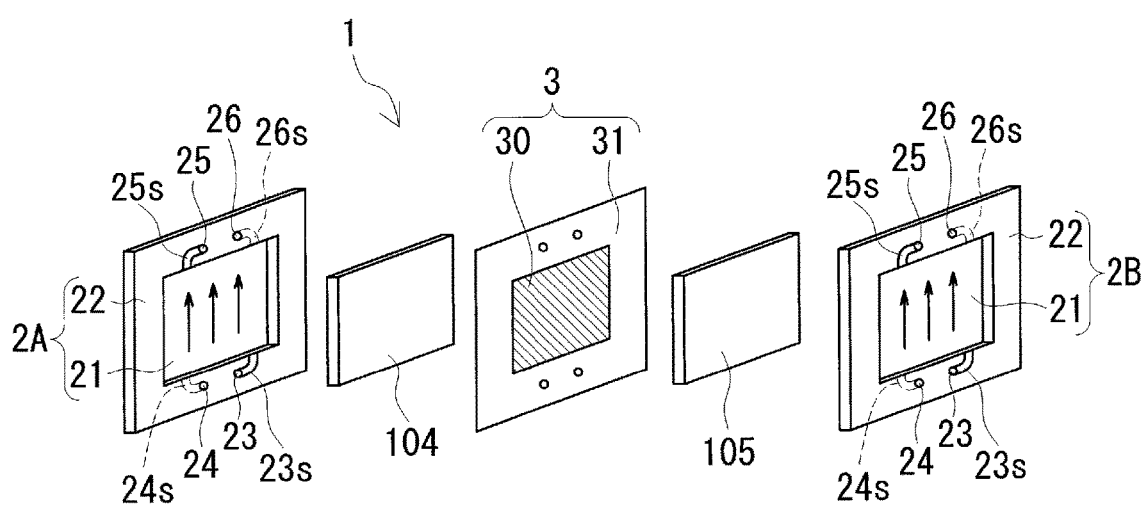
FIG. 6 is an exploded view of a cell according to Embodiment 2.
Figure 7:
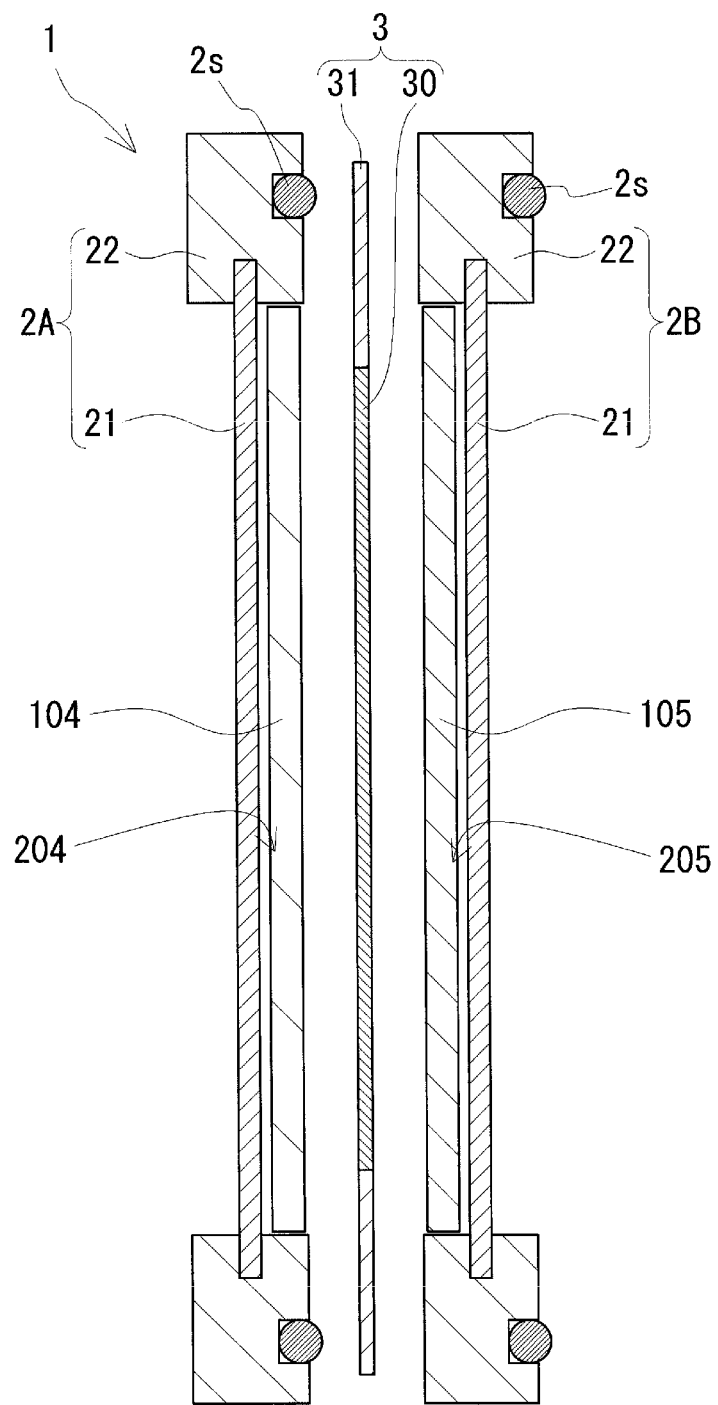
FIG. 7 is a vertical cross-sectional view of the cell according to Embodiment 2.

As shown in FIGS. 6 and 7, the cell 1 of this example is different from the cell 1 of Embodiment 1, in that the frame seals 4A and 4B (FIGS. 2 and 3) are not used, and that the membrane 3 is larger than each of the electrodes 104 and 105.

The membrane 3 is constituted by the ion permeable portion 30, and an ion impermeable portion 31 that surrounds the outer periphery of the ion permeable portion 30. The membrane 3 having this configuration can be obtained, for example, by preparing a substrate that is impermeable to hydrogen ions, and performing aftertreatment on the center portion of the substrate. In this case, the portion of the substrate subjected to aftertreatment forms the ion permeable portion 30, and the other portion forms the ion impermeable portion 31. Examples of the aftertreatment include application of or impregnation with ion exchange resin, sintering with impregnation with polymer alcohol, and the like.

The planar area of the ion permeable portion 30 of the membrane 3 is smaller than each of the planar areas of the electrodes 104 and 105, and the planar area of the entire membrane 3 is larger than each of the planar areas of the through windows of the frame members 22. If the membrane 3 is sandwiched between the cell frames 2A and 2B, the ion impermeable portion 31 of the membrane 3 is in contact with the inner peripheral edge of the frame member 22 of the first cell frame 2A and the inner peripheral edge of the frame member 22 of the second cell frame 2B. It is preferable that the ion impermeable portion 31 has a size that allows the ion impermeable portion 31 to further reach the sealing members 2s, and, with this configuration, the positive and negative electrolyte solutions can be easily sealed respectively in the positive electrode space 204 and the negative electrode space 205, and the electrolyte solutions are unlikely to leak the outside of the cell 1.

With the configuration of this example, the entire face of the ion permeable portion 30 is a facing portion that faces the electrodes 104 and 105. That is to say, the planar area of the facing portion is the planar area of the ion permeable portion 30. In this case, if the planar area of the ion permeable portion 30 is set to 50% or more and 99.9% or less of the planar areas of the electrodes 104 and 105, the emergency electrolyte solution can be stored in the cell 1 in a way similar to that of the cell 1 of Embodiment 1. Accordingly, if an RF battery system α shown in FIG. 5 is constructed using the cell 1 of this example, it is possible to obtain an RF battery system α that can discharge electricity by itself to the power grid 9 when the power grid 9 fails.

Applications

The RF battery system α of this embodiment can be used in new energy generation such as solar photovoltaic power generation and wind power generation, as storage cell systems that are to stabilize a change in the generated power, to store electric power when it is excessively generated, to level the load, and the like. In addition, the RF battery system α of this embodiment can be used also as large-capacity storage cell systems that are installed in typical power plants and that are to measure against an instantaneous voltage drop and a blackout, and to level the load.

Test Example

In a test example, test cells A to D were produced in which the planar area of the membrane 3 of the cell 1 of Embodiment 1 was variously changed, and it was tested whether or not the circulation pumps 112 and 113 of the RF battery system α in FIG. 5 can be started using the electrolyte solutions remaining in the test cells A to D. The same electrode 104 and the same electrode 105 were used in the test cells A to D, wherein the planar areas of the electrodes 104 and 105 were both 250 cm², and the thicknesses thereof were both 1 mm.

Test cell A . . . The cell 1 in which, in the ion permeable portion 30, the planar area of a facing portion that faces the electrodes 104 and 105 was set to 99.9% of the planar area of the electrodes 104 and 105

Test cell B . . . The cell 1 in which the planar area of the facing portion was set to 75% of the planar area of the electrodes 104 and 105

Test cell C . . . The cell 1 in which the planar area of the facing portion was set to 99.95% of the planar area of the electrodes 104 and 105

Test cell D . . . The cell 1 in which the planar area of the facing portion was set to be equal to the planar area of the electrodes 104 and 105

As a result of the test, the test cells A and B started the circulation pumps 112 and 113, whereas the test cells C and D did not start the circulation pumps 112 and 113. It was seen from these results that, in order to allow the cell 1 to store an emergency electrolyte solution that is sufficient enough to start the circulation pumps 112 and 113, it is necessary to at least set the planar area of the facing portion of the ion permeable portion 30 to 99.9% or less of the planar area of the electrodes 104 and 105.

| List of Reference Numerals | | |
|---|---|---|
| α | Redox flow battery system (RF battery system) | |
| 10 | Redox flow battery (RF battery) | |
| 1 | Cell | |
| 2A | First cell frame | |
| 2B | Second cell frame | |
| | 2s | Sealing member |
| | 21 | Bipolar plate |
| | 22 | Frame member |
| | 23, 24 | Supply manifold |
| | 25, 26 | Discharge manifold |
| | 23s, 24s | Inlet slit |
| | 25s, 26s | Outlet slit |
| | 204 | Positive electrode space |
| | 205 | Negative electrode space |
| 3 | Membrane | |
| | 30 | Ion permeable portion |
| | 31 | Ion impermeable portion |
| 4A, 4B | Frame seal | |
| | 40 | Through hole |
| | 41 | Inner peripheral portion |
| | 42 | Outer peripheral portion |
| 5 | Cell stack | |
| | 5s | Sub stack |
| | 50 | Stacked body |
| | 51 | Supply/discharge plate |
| | 52 | End plate |
| | 53 | Tightening mechanism |
| 6 | Charge/discharge control unit (control unit) | |
| 7 | Pump line | |
| 8 | Electrolyte solution | |
| | 8P | Positive electrolyte solution |
| | 8N | Negative electrolyte solution |
| 9 | Power grid | |
| | 90 | Substation |
| | 91 | Power converter |
| | 90S | Detecting apparatus |
| 100 | Cell | |
| | 101 | Membrane |
| | 102 | Positive electrode cell |
| | 103 | Negative electrode cell |

-continued

| List of Reference Numerals | |
|---|---|
| 100P | Positive electrode circulation mechanism |
| 100N | Negative electrode circulation mechanism |
| 104 | Positive electrode |
| 105 | Negative electrode |
| 106 | Positive electrolyte solution tank |
| 107 | Negative electrolyte solution tank |
| 108, 109, 110, 111 | Pipe |
| 112, 113 | Circulation pump |

The invention claimed is:

1. A cell that includes a positive electrode, a negative electrode and a membrane interposed between the electrodes, and that is used in a redox flow battery,
wherein the membrane includes an ion permeable portion that is permeable to hydrogen ions, at least at a center of the membrane in a plan view,
planar areas of the positive electrode and the negative electrode are both 250 cm$^2$ or more, and a planar area of the ion permeable portion is smaller than each of the planar areas of the positive electrode and the negative electrode, and
in the ion permeable portion, a planar area of a facing portion that actually faces the positive electrode and the negative electrode is 50% or more and 99.9% or less of a smaller of the planar areas of the positive electrode and the negative electrode.

2. The cell according to claim 1,
wherein a planar area of the membrane is smaller than each of the planar areas of the positive electrode and the negative electrode.

3. The cell according to claim 2, further comprising:
a first cell frame and a second cell frame that each have a bipolar plate and a frame member, and sandwich the membrane from one face side and another face side thereof;
a positive electrode space that is defined by the membrane and the bipolar plate of the first cell frame, and accommodates the positive electrode;
a negative electrode space that is defined by the membrane and the bipolar plate of the second cell frame, and accommodates the negative electrode; and
a frame seal including an outer peripheral portion that is not in contact with the membrane and is in contact with the entire inner peripheral edge of the frame member, and an inner peripheral portion that is in contact with the entire outer peripheral edge of the membrane.

4. The cell according to claim 3,
wherein thicknesses of the positive electrode and the negative electrode are both 0.1 mm or more and 4 mm or less.

5. The cell according to claim 2,
wherein thicknesses of the positive electrode and the negative electrode are both 0.1 mm or more and 4 mm or less.

6. The cell according to claim 1,
wherein the membrane includes the ion permeable portion, and a frame-like ion impermeable portion that surrounds an outer periphery of the ion permeable portion, and
a planar area of the membrane is larger than each of the planar areas of the positive electrode and the negative electrode.

7. The cell according to claim 6, further comprising:
a first cell frame and a second cell frame that each have a bipolar plate and a frame member, and sandwich the membrane from one face side and another face side thereof;
a positive electrode space that is defined by the membrane and the bipolar plate of the first cell frame, and accommodates the positive electrode; and
a negative electrode space that is defined by the membrane and the bipolar plate of the second cell frame, and accommodates the negative electrode,
wherein the ion impermeable portion of the membrane is in contact with an inner peripheral edge of the frame member of the first cell frame and an inner peripheral edge of the frame member of the second cell frame.

8. The cell according to claim 7,
wherein thicknesses of the positive electrode and the negative electrode are both 0.1 mm or more and 4 mm or less.

9. The cell according to claim 6,
wherein thicknesses of the positive electrode and the negative electrode are both 0.1 mm or more and 4 mm or less.

10. The cell according to claim 1,
wherein thicknesses of the positive electrode and the negative electrode are both 0.1 mm or more and 4 mm or less.

11. A cell stack comprising:
a stacked body formed by stacking a plurality of the cells according to claim 1; and
a pair of end plates that sandwich the stacked body from both sides of a stacking direction thereof.

12. A redox flow battery comprising:
the cell stack according to claim 11,
a positive electrode circulation mechanism for circulating a positive electrolyte solution in the cells; and
a negative electrode circulation mechanism for circulating a negative electrolyte solution in the cells.

13. A redox flow battery system comprising:
the redox flow battery according to claim 12,
a detecting apparatus that detects a failure of a power grid connected to the redox flow battery; and
a control unit that operates the positive electrode circulation mechanism and the negative electrode circulation mechanism, using the positive electrolyte solution and the negative electrolyte solution remaining in the cells, based on a detection result by the detecting apparatus.

* * * * *